US009091235B2

(12) United States Patent
Stark et al.

(10) Patent No.: US 9,091,235 B2
(45) Date of Patent: Jul. 28, 2015

(54) AIR INLET SYSTEM FOR AN INTERNAL COMBUSTION ENGINE

(75) Inventors: Stefan Stark, Huskvarna (SE); Cecilia Åkesson, Svedala (SE)

(73) Assignee: HUSQVARNA AB, Huskvarna (SE)

( * ) Notice: Subject to any disclaimer, the term of this patent is extended or adjusted under 35 U.S.C. 154(b) by 155 days.

(21) Appl. No.: 13/522,059

(22) PCT Filed: Jan. 14, 2010

(86) PCT No.: PCT/SE2010/050025
§ 371 (c)(1),
(2), (4) Date: Jul. 13, 2012

(87) PCT Pub. No.: WO2011/087409
PCT Pub. Date: Jul. 21, 2011

(65) Prior Publication Data

US 2012/0318143 A1 Dec. 20, 2012

(51) Int. Cl.
*F02M 35/02* (2006.01)
*B01D 46/00* (2006.01)
(Continued)

(52) U.S. Cl.
CPC ............ *F02M 35/024* (2013.01); *F02M 17/34* (2013.01); *F02M 35/1017* (2013.01);
(Continued)

(58) Field of Classification Search
CPC .. B01D 46/008; B01D 46/0023; B01D 46/10; B01D 2277/20; F02M 35/024; F02M 35/02
USPC ......... 55/321, 327, 444, 462, 385.3, DIG. 28; 123/198 E; 210/243, 321.79, 321.88, 210/321.78, 321.8; 422/130; 96/1, 227, 263
See application file for complete search history.

(56) References Cited

U.S. PATENT DOCUMENTS 3,792,573 A * 2/1974 Borsheim ....................... 55/337
4,425,145 A * 1/1984 Reese .......................... 55/385.3
(Continued)

FOREIGN PATENT DOCUMENTS

DE 3819728 A1 1/1989
GB 765011 A 1/1957
(Continued)

OTHER PUBLICATIONS

International Search report and Written Opinion of PCT/SE2010/050025 mailed Sep. 23, 2010.
(Continued)

*Primary Examiner* — Duane Smith
*Assistant Examiner* — Minh-Chau Pham
(74) *Attorney, Agent, or Firm* — Nelson Mullins Riley & Scarborough LLP

(57) ABSTRACT

An air inlet system (100) for an internal combustion engine includes an air filter (1) and a flow resistance means (2). The air filter (1) includes one or more filter elements (12), an interior chamber (3) and a suction opening (6). The suction opening (6) is provided to connect the interior chamber (3) to a suction channel (7) of an engine. During operation of the engine, the combustion air flows through the one or more filter elements (12) into the interior chamber (3) and from the interior chamber (3) into the suction channel (7). Further, the interior chamber (3), the suction opening (6) and the suction channel (7) together define a combustion air flow path. The flow resistance means (2) is provided in the combustion air flow path. During the operation of the engine, a portion of the combustion air flows through the flow resistance means (2).

20 Claims, 3 Drawing Sheets

(51) Int. Cl.

| | |
|---|---|
| ***F02M 35/024*** | (2006.01) |
| ***F02M 17/34*** | (2006.01) |
| ***F02M 35/10*** | (2006.01) |

(52) U.S. Cl.

CPC .. *F02M 35/10019* (2013.01); *F02M 35/10222* (2013.01); *F02M 35/1019* (2013.01); *F02M 35/10196* (2013.01); *F02M 35/10321* (2013.01); *F02M 35/10334* (2013.01)

(56) References Cited

U.S. PATENT DOCUMENTS

| | | | | |
|---|---|---|---|---|
| 4,600,418 | A * | 7/1986 | Gommel et al. | 55/462 |
| 4,653,457 | A * | 3/1987 | Stege | 123/572 |
| 4,758,460 | A | 7/1988 | Spicer et al. | |
| 4,861,359 | A * | 8/1989 | Tettman | 55/419 |
| 4,998,891 | A * | 3/1991 | Bresko | 439/369 |
| 5,503,649 | A * | 4/1996 | Nickel | 55/321 |
| 7,562,652 | B2 | 7/2009 | Hommes et al. | |
| 7,722,706 | B2 * | 5/2010 | Thielow | 95/211 |
| 7,802,651 | B2 * | 9/2010 | Park et al. | 181/224 |
| 7,867,311 | B1 * | 1/2011 | Connor et al. | 55/482 |
| 8,167,968 | B2 * | 5/2012 | Sato et al. | 55/385.3 |
| 8,535,401 | B2 * | 9/2013 | Winkler | 55/307 |
| 8,696,780 | B2 * | 4/2014 | Bichl et al. | 55/484 |
| 2004/0050252 | A1 * | 3/2004 | Wernholm et al. | 95/143 |
| 2004/0079344 | A1 | 4/2004 | Gimby et al. | |
| 2004/0255911 | A1 | 12/2004 | Abdolhosseini et al. | |
| 2005/0050868 | A1 * | 3/2005 | Bugli et al. | 55/482 |
| 2006/0243656 | A1 * | 11/2006 | Ooiwa | 210/497.1 |
| 2006/0272508 | A1 * | 12/2006 | Hoke et al. | 96/134 |
| 2007/0068388 | A1 * | 3/2007 | Shears et al. | 96/134 |
| 2007/0079702 | A1 | 4/2007 | Hurley et al. | |
| 2007/0175192 | A1 | 8/2007 | Niakan et al. | |
| 2008/0314248 | A1 * | 12/2008 | Peteln | 96/1 |
| 2011/0136567 | A1 * | 6/2011 | Bichl et al. | 463/25 |
| 2012/0186207 | A1 * | 7/2012 | Ushiyama et al. | 55/493 |

FOREIGN PATENT DOCUMENTS

| | | | |
|---|---|---|---|
| JP | 2003035222 | A | 2/2003 |
| JP | 2008175184 | A | 7/2008 |
| WO | 2009087163 | A1 | 7/2009 |

OTHER PUBLICATIONS

Chapter II International Preliminary Report on Patentability of PCT/SE2010/050025 mailed May 7, 2012.

* cited by examiner

AIR INLET SYSTEM FOR AN INTERNAL COMBUSTION ENGINE

TECHNICAL FIELD

The present invention relates to an air filter for an internal combustion engine, specifically the invention relates to a two-stroke combustion engine used in a hand-held power tool, for example but not limited to, power-saws, trimmers etc.

BACKGROUND ART

Two-stroke combustion engines are widely used in hand-held power tools. Typically, a two-stroke combustion engine includes an air filter provided in a suction channel of the engine. The air filter is essential to ensure a proper operation of the engine. The air filter traps the dust and other particulate matter present in the combustion air and provides clean air to the engine. Typically, an air filter includes an interior chamber, one or more filter elements and a suction opening for connecting the air filter to the suction channel of the engine. During operation of the engine, the combustion air flows through the one or more filter elements into the interior chamber and further, passes through the suction opening into the suction channel of the engine.

As well known in the art, in the two-stroke combustion engine, the suction channel is further connected to a crankcase or a cylinder. During operation of the engine a mixture of unburned fuel and lubricant present in the crankcase may flow back into the suction channel. The back flow of the mixture of unburned fuel and lubricant from the crankcase into the suction channel is referred as back flow or back spit. In case of a two-stroke combustion engine, where no system is provided to control the back flow or back spit, the mixture of unburned fuel and lubricant may clog and plug the air filter prematurely and hence, the air filter needs be cleaned or replaced very frequently.

Typically, the cost of the air filter is low, and its replacement is a small additional bother that is addressed along with other maintenance work. However, in case of power tools which are used in dusty environments, such as high performance applications, industrial and farming applications, the cost of air filter replacement may be significant, and thus a significant increase in filter performance and lifespan may be required. In the prior art, in order to minimize the back flow, valves may be used in the crankcase and/or the suction channel. However, the design and installation of such valves is reasonably complicated and expensive.

Therefore, there is a need for a means for improving the service life of two-stroke combustion engines and specifically of the air filters by controlling the back flow in two-stroke combustion engines. Moreover, there is a need for a means for controlling the flow of the combustion air in a suction direction of the air filter.

SUMMARY OF THE INVENTION

In view of the above, it is an objective to solve or at least reduce the problems discussed above. In particular, the objective is to provide an improved air inlet system, for a two-stroke combustion engine used in power tools. The air inlet system has a simple design, and prevents the clogging of an air filter by back flow or back spit.

The objective is achieved with a novel air inlet system, in which the air inlet system includes an air filter and a flow resistance means. The air filter includes one or more filter elements, an interior chamber and a suction opening. The suction opening is provided to connect the interior chamber to a suction channel of an engine. During operation of the engine, the combustion air flows through the one or more filter elements into the interior chamber and from the interior chamber into the suction channel. Further, the interior chamber, the suction opening and the suction channel define a combustion air flow path and the flow resistance means is provided in the combustion air flow path. During the operation of the engine, a portion of the combustion air flows through the flow resistance means. The portion of the combustion air that flows through the flow resistance means may be in the range 20%-100%, which means at least 20%, 30%, 40%, 50%, 60%, 70%, 80% or at least 90% of the combustion air, or even 100% of the combustion air.

Preferably, the flow resistance means may absorb unburned fuel and/or lubricant during a back flow from the combustion engine through the combustion air path. Thus, the flow resistance means may prevent the unburned fuel and lubricant to reach the one or more filter elements and avoids clogging of the filter elements due to the back flow or back spit.

The combustion air flow path defined between the interior chamber, the suction opening and the suction channel has a cross-section area lying in a plane that is substantially transverse to a mean flow direction of the combustion air. Further, the flow resistance means may cover at least 30% to at least 70% of the cross-section area, such as at least 40%, 50%, 60%, 80% or at least 90%, or even 100% of the cross-section area.

The air inlet system may be used in a two-stroke combustion engine. The two-stroke combustion engine includes an air supply passage which connects the interior chamber to one or more transfer ducts of the engine and supplies an additional air to the one or more transfer ducts. Further, a portion of the additional air may flow through the flow resistance means. The portion of the additional air that flows through the flow resistance means may be in a range of 10% to 100% of the additional air, such as at least 10%, 20%, 30%, 40%, 50%, 60%, 70%, 80% or 90%. Alternatively, the additional air may not flow through the flow resistance means.

The flow resistance means may include a plastic or rubber foam, or even a metallic structure. Further, the foam/metallic structure may extend at least 2 mm to at least 3 mm in a direction of the combustion air flow and a mean cell diameter of the foam/metallic structure is in a range of about 1000 μm to 3000 μm. Further, the foam/metallic structure may extend at least 3 mm to at least 4 mm in the direction of the combustion air flow and the mean cell diameter of the foam/metallic structure is in a range of about 3000 μm to 5000 μm. Further, the foam/metallic structure may extend at least 4 mm to at least 5 mm in the direction of the combustion air flow and the mean cell diameter of the foam/metallic structure is in a range of about 5000 μm to 8000 μm.

The mean cell diameter of the foam/metallic structure may be in a range about 2000 μm to 7000 μm and the foam/metallic structure is disposed in the interior chamber of the air filter. Further, the air filter may include a housing to accommodate the interior chamber. The housing is formed of one or more housing shells. One housing shell may include the one or more filter elements whereas another housing shell may include the suction opening. The foam/metallic structure may be attached to the housing shell which includes the one or more filter elements. However, in certain embodiments, the foam/metallic structure may be attached to the housing shell which includes the suction opening.

The foam may be made of a polyester material and a mean density of the polyester material may be in a range between 20 $kg/m^3$ to 50 $kg/m^3$. Further, the filter element may be made of a plastic or rubber foam, a nylon mesh or felt.

The present invention also provides for a method for sucking the combustion air to the engine. The method may include the steps of providing a plastic or rubber foam, or even a metallic structure, in the combustion air flow path. The method further includes a step of sucking a portion of the combustion air through the foam. The portion of the combustion air that passes through the foam or metallic structure may be at least 30% or at least 40% of the combustion air. Preferably, the portion of the combustion air that passes through the foam may be at least 50%, 60%, 70%, 80%, 90% or even 100%.

The foam/metallic structure may have the mean cell diameter in a range of 2000 μm to 7000 μm, such as between 3000 and 6000 μm and preferably between 3800 and 5200 μm.

BRIEF DESCRIPTION OF THE DRAWINGS

The invention will in the following be described in more detail with reference to the enclosed drawings, wherein.

DETAILED DESCRIPTION

Figure 1:
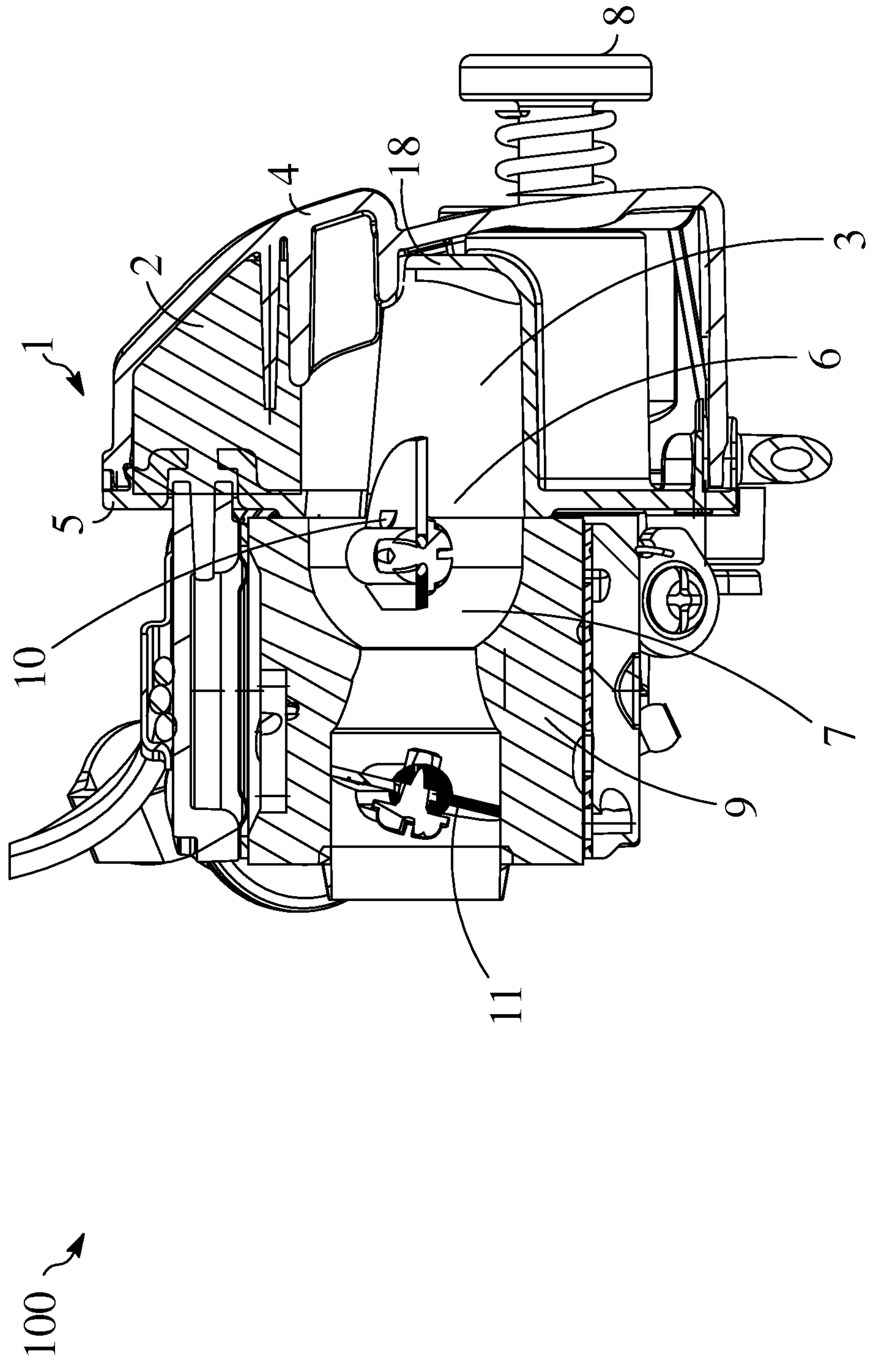
FIG. 1 shows a sectional view of an air intake system 100 of an internal combustion engine, according to an embodiment of the present invention.

The present invention will be described more fully hereinafter with reference to the accompanying drawings, in which preferred embodiments of the invention are shown. This invention may, however, be embodied in many different forms herein; rather, these embodiments are provided so that this disclosure will be thorough and complete, and will fully convey the scope of the invention to those skilled in the art. In the drawings, like numbers refer to like references.

FIG. 1 shows a sectional view of an air inlet system 100 of an internal combustion engine, according to an example embodiment of the present invention. The air inlet system 100 supplies combustion air to the internal combustion engine. Although the example embodiment is shown to be used in conjunction with an internal combustion engine, it should be understood that the present invention could be incorporated into any suitable type of engine or equipment and is not limited to use merely in an internal combustion engine and, may be incorporated in different types of embodiments. The internal combustion engine may generally be either a gasoline engine or a diesel engine. Typically, the internal combustion engine includes a crankcase and at least one cylinder. A piston is reciprocable in the cylinder and is connected to a crankshaft via a connecting rod. In various embodiments of the present invention, the internal combustion engine may be a two-stroke engine for hand-held working tools, such as chainsaws, power cutters, trimmers etc.

The air inlet system 100 of the internal combustion engine includes an air filter 1 and a flow resistance means 2. The air filter 1 includes a housing and at least one filter element (not shown in FIG. 1). The housing may accommodate an interior chamber 3. In an embodiment of the present invention, the housing may be formed of a first housing shell 4 and a second housing shell 5. In another embodiment of the present invention, the first housing shell 4 includes the at least one filter element whereas the second housing shell 5 includes a suction opening 6. The suction opening 6 connects the interior chamber 3 to a suction channel 7 of the internal combustion engine. Combustion air flows through the at least one filter element 12 into the interior chamber 3 and, hence from the interior chamber 3 through the suction opening 6 into the suction channel 7. The interior chamber 3, the suction opening 6 and the suction channel 7 together define a combustion air flow path. The flow resistance means 2 is arranged in the combustion air flow path. The housing shells 4 and 5 may include one or more holes (not shown in FIG. 1) for insertion of fastening screws. For example, a screw 8 may be provided for fastening the first housing shell 4 to the second housing shell 5. The screw 8 is inserted in corresponding holes present in the first and second housing shells 4 and 5.

The minimum percentage of the combustion air that passes through the flow resistance means 2 is hereinafter referred to as first threshold percentage. The first threshold percentage may depend on the design of the flow resistance means 2. In an embodiment of the present invention, the first threshold percentage may be at least 20%. In a preferred embodiment of the present invention, the first threshold percentage may be at least 30%. In another preferred embodiment of the present invention, the first threshold percentage may be at least 40%. Further, in various embodiments of the present invention, the first threshold percentage may be in the range of 50-100%, such as at least 60%, 70%, 80% or 90%.

During an air intake phase of an engine cycle, the combustion air is sucked through air inlet system 100 and is mixed with fuel to form a combustible mixture. The combustible mixture may be formed in a fuel supply unit 9 which may be a carburettor.

Further, a choke valve 10 may be provided to modify the air pressure in the air inlet system 100 of the internal combustion engine, thereby altering the ratio of fuel and air quantity entering the engine. The choke valve 10 may be used to supply a richer fuel-air mixture when starting the internal combustion engine. Moreover, a throttle valve 11 may be provided downstream of the choke valve 10 to regulate the amount of fuel-air mixture entering the engine.

The combustible mixture is ignited in the engine to drive the piston in a power stroke of the engine cycle. Especially during the power stroke, some of the unburned fuel and/or lubricant may flow back along with combustion air into the air inlet system 100. The fuel-air mixture together with unburned fuel and/or lubricant that escapes into the air inlet system 100 is generally referred to as back flow or back spit.

In an embodiment of the present invention, the flow resistance means 2 absorbs fuel and/or lubricant flowing back from the internal combustion engine. More specifically, the back spit flowing along the combustion air flow path towards the air filter 1 has to pass through the flow resistance means 2. This prevents the flow of fuel and/or lubricant reaching the filter element/s 12 of the air filter 1, which results in an improvement of service life of the air filter 1.

Further, in various embodiments of the present invention, the fuel and/or the lubricant that is absorbed in the flow resistance means 2 may be drawn back into the combustion engine during the air intake phase of the internal combustion engine. This results in an efficient utilization of the fuel and/or the lubricant present in the back flow from the internal combustion engine.

The flow resistance means 2 is arranged in the combustion air flow path defined by the interior chamber 3, the suction opening 6, and the suction channel 7. The combustion air flow path has a cross section area lying in a plane substantially transverse to a mean flow direction of the combustion air. The minimum percentage of the cross section area that is covered by the flow resistance means 2 is hereinafter referred to as second threshold percentage. In an embodiment of the present invention, the second threshold percentage may be at least 30%. In a preferred embodiment of the present invention, the second threshold percentage may be at least 50%. In another preferred embodiment of the present invention, the second threshold percentage may be at least 70%. The second threshold percentage may also be at least 40%, 60%, 80%, 90% or even at least 95%.

Figure 2:
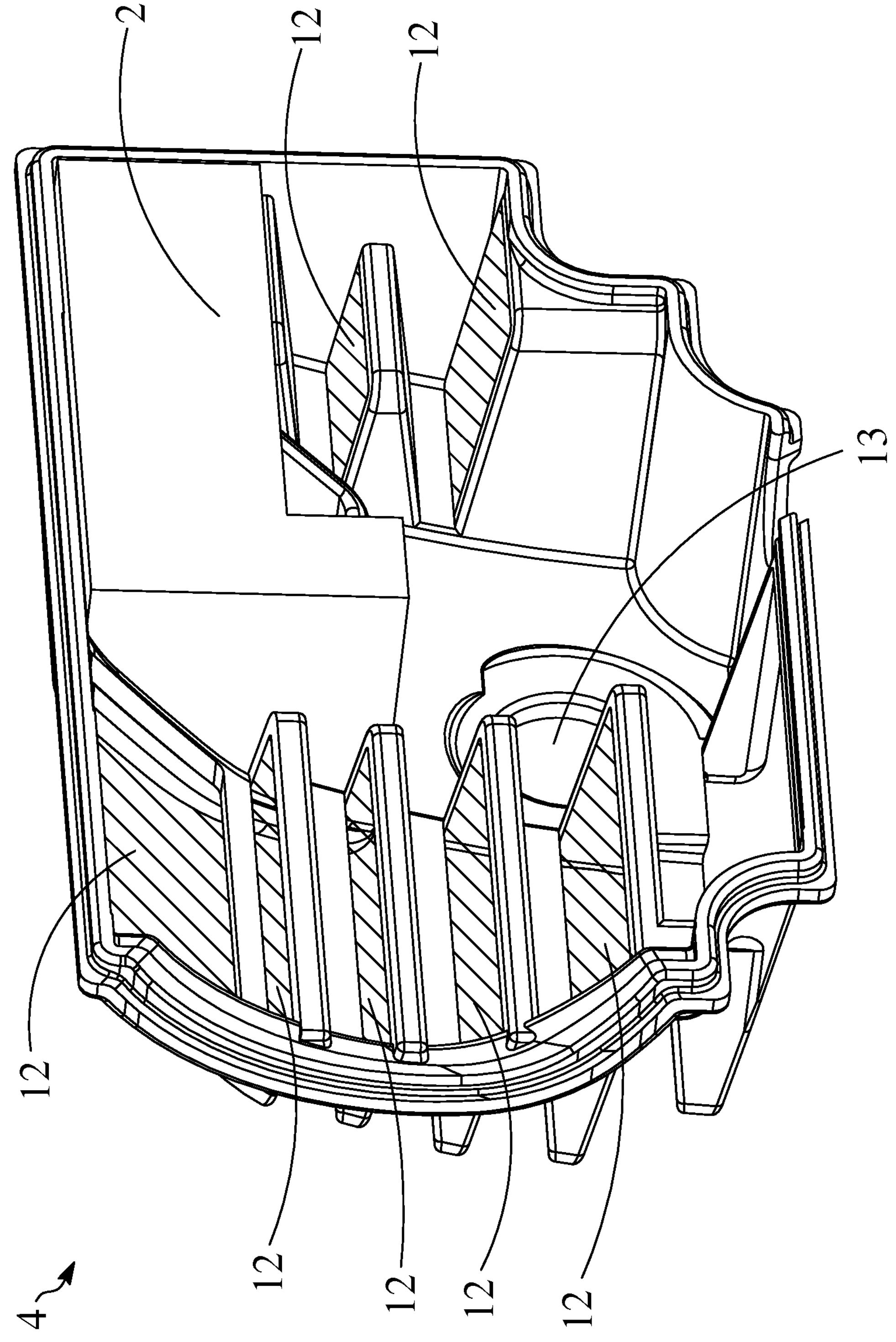
FIG. 2 shows a perspective view of a first housing shell 4 of an air filter of the engine, according to an embodiment of the present invention.

FIG. 2 illustrates a perspective view of the first housing shell 4 of the air filter 1, according to an example embodiment of the present invention. As shown in the FIG. 2, the first housing shell 4 includes a plurality of filter elements 12 and the flow resistance means 2. A hole 13 may be provided for fastening the first housing shell 4 to the second housing shell 5 (shown in FIG. 3). In an embodiment of the present invention, each of the filter elements 12 may be made of a plastic or rubber foam, a nylon mesh or felt.

In an embodiment of the present invention, the flow resistance means 2 may be a plastic or rubber foam or a metallic structure. Further, in various embodiments of the present invention, the flow resistance means 2 may be extended in a direction of the combustion air flow. In an embodiment of the present invention, the flow resistance means 2 may extend at least 2 mm and preferably at least 3 mm in the direction of the combustion air flow and a mean cell diameter of the flow resistance means 2 may be in the range of 1000-3000 μm. In another embodiment of the present invention, the flow resistance means 2 may extend at least 4 mm and preferably more than 5 mm in the direction of the combustion air flow, and the mean cell diameter of the flow resistance means 2 may be in the range of 3000-5000 μm. Further, in various embodiments of the present invention, the flow resistance means 2 may extend at least 4 mm and preferably more than 5 mm in the direction of the combustion air flow, and the mean cell diameter of the flow resistance means 2 may be in the range of 5000-8000 μm.

In accordance with an embodiment of the present invention, the mean cell diameter of the flow resistance means 2 may be in the range of 2000-7000 μm. In a preferred embodiment of the present invention, the mean cell diameter of the flow resistance means 2 may be in the range of 3000-6000 μm. Further, in another preferred embodiment of the present invention, the mean cell diameter of the flow resistance means 2 may be in the range of 3800-5200 μm. In an embodiment of the present invention, the flow resistance means 2 may be disposed in the interior chamber 3. The flow resistance means 2 may be disposed preferably in the vicinity of or in the air filter 1. As shown in FIG. 2, the flow resistance means 2 may be attached to the first housing shell 4 which includes the filter elements 12. However, in another embodiment of the present invention, the flow resistance means 2 may be attached to the second housing shell 5 which includes the suction opening 6.

Further, in an embodiment of the present invention, the flow resistance means 2 may be a foam made of a polyester material. However, a person ordinarily skilled in the art may appreciate that the flow resistance means 2 may be made of other materials. In an embodiment of the present invention, mean density of the flow resistance means 2 may be in the range of 20-50 kg/$m^3$. In a preferred embodiment of the present invention, mean density of the flow resistance means 2 may be in the range of 23-35 kg/$m^3$.

Figure 3:
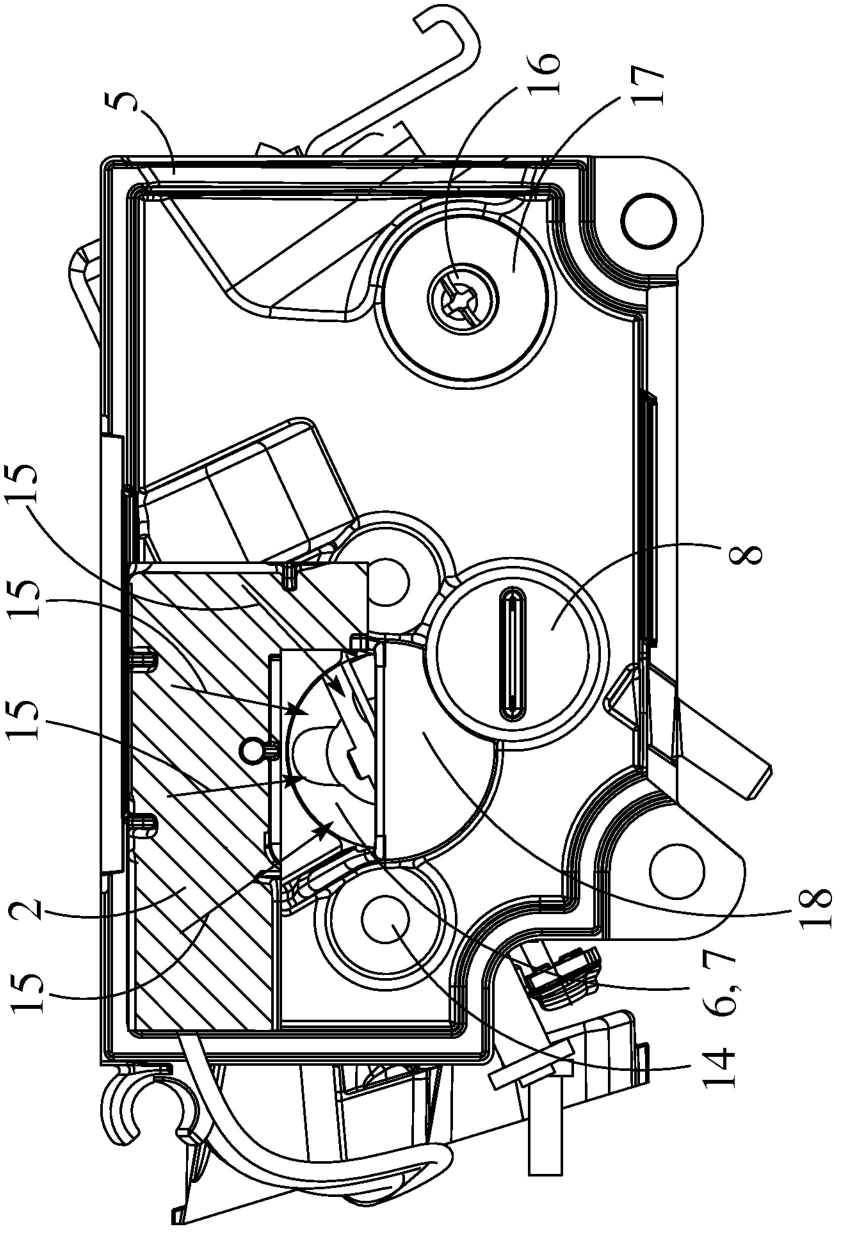
FIG. 3 shows a front elevation view of a second housing shell 5 of the air filter of the engine, according to an embodiment of the present invention.

FIG. 3 illustrates a front elevation view of the second housing shell 5 of the air filter 1, according to an example embodiment of the present invention. The second housing shell 5 may include a plurality of holes 14 for the insertion of fastening screws for fastening of the second housing shell 5 to e.g. a fuel supply unit 9 (only referenced in FIG. 1) such as a carburettor. The screw 8 may pass through the hole 13 (only referenced in FIG. 2) in the first housing shell 4 and the corresponding hole in the second housing shell 5. In an alternative configuration the air filter is not directly attached to the fuel supply unit. Then, there may be at least one separate tube between the air filter and the fuel supply unit for leading combustion air and/or additional air. This may be advantageous because of limitations in space or other reasons. As shown in FIG. 3, the flow resistance means 2, which may be a plastic or rubber foam, or a metallic structure, is attached to the second housing shell 5. Further, the suction channel 7 may be extended into the interior chamber 3 (see FIG. 1) and end with a semi-circular wall 18 (also referenced in FIG. 1). The flow resistance means 2 is provided in the combustion air flow path such that the combustion engine sucks the air through the flow resistance means 2. Combustion air, as shown by arrows 15 is sucked into the suction channel 7 after passing through the flow resistance means 2. The combustion air is preferably guided by walls of the first-4 and/or the second housing shell 5, such as the semi-circular wall 18, so that the combustion air substantially enters the extended suction channel from above, as illustrated in FIG. 3. According to a preferred configuration of the present invention, the combustion air may be guided such that up to 100% of the combustion air flows through the flow resistance means 2.

In an embodiment of the present invention, the internal combustion engine may be a crankcase scavenged two-stroke combustion engine with an air supply passage 16. The air supply passage may connect the interior chamber 3 with one or more transfer ducts (not shown in the figures) of the combustion engine. In a further embodiment of the present invention, an air valve 17 may be provided in the air supply passage 16 for regulating the amount of air entering the one or more transfer ducts. The air supply passage provides additional air to the one or more transfer ducts of the engine via a piston controlled port upon decrease of pressure in the crank case. This enables buffering of fresh air in the transfer duct/s and a combustion chamber in communication with the transfer channel/s can be flushed with fresh air before it is supplied with air/fuel mixture. The flushing implies that a very small amount of unburned fuel may leave the engine. In an embodiment of the present invention, the additional air may flow through the flow resistance means 2. The minimum percentage of the additional air that flows through the flow resistance means 2 is hereinafter referred to as third threshold percentage. In an embodiment of the present invention, the third threshold percentage may be at least 10% or at least 20%. In an alternative embodiment of the present invention, the third threshold percentage may be at least 30% or at least 40%. In another alternative embodiment of the present invention, the third threshold percentage may be at least 50%, such as at least 60%, 70%, 80%, or 90%, or even 100%. Further, in a preferred embodiment of the present invention, the additional air may not flow through the flow resistance means 2.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. An air inlet system for a crankcase scavenged two-stroke internal combustion engine, the air inlet system comprising:

an air filter which includes at least one filter element; an interior chamber; and a suction opening for connecting said interior chamber to a suction channel of the combustion engine; wherein combustion air flows through the at least one filter element into the interior chamber and from the interior chamber through the suction opening into the suction channel, and wherein the engine is provided with an air supply passage which connects the interior chamber with at least one transfer duct of the engine for supplying additional air to said at least one transfer duct;

the air inlet system further comprising flow resistance foam;

wherein the interior chamber, the suction opening and the suction channel define a combustion air flow path, wherein the flow resistance foam is a plastic foam or rubber foam arranged in said combustion air flow path between the at least one filter element and the suction opening such that at least a first portion of the combustion air flows through the flow resistance foam such that the flow resistance foam absorbs fuel or lubricant flowing back from the combustion engine through the combustion air path towards the at least one filter element and thereby prevents said fuel or lubricant from reaching the at least one filter element, wherein the mean cell diameter of the flow resistance foam range between 2000 and 7000 μm.

2. An air inlet system according to claim 1, wherein the first portion is at least 50% of the combustion air and flows through the flow resistance foam.

3. An air inlet system according to claim 2, wherein the first portion is at least 80% of the combustion air and flows through the flow resistance foam.

4. An air inlet system according to claim 1, wherein the combustion air flow path has a cross section area lying in a plane substantially transverse to a mean flow direction, wherein the flow resistance foam covers at least 30% of said cross section area.

5. An air inlet system according to claim 1, wherein at least 10% of said additional air flows through the flow resistance foam.

6. An air inlet system according to claim 1, wherein the additional air does not flow through the flow resistance foam.

7. An air inlet system according to claim 1, wherein the flow resistance foam extends at least 2 mm in a direction of the combustion air flow and the foam has a mean cell diameter between 2000 and 3000 μm.

8. An air inlet system according to claim 1, wherein the flow resistance foam extends at least 3 mm in a direction of the combustion air flow and the foam has a mean cell diameter between 3000 and 5000 μm.

9. An air inlet system according to claim 1, wherein the flow resistance foam extends at least 4 mm in a direction of the combustion air flow and the foam has a mean cell diameter between 5000 and 7000 μm.

10. An air inlet system according to claim 1, wherein the flow resistance foam is disposed in the interior chamber.

11. An air inlet system according to claim 1, wherein the air filter includes a housing accommodating the interior chamber, which housing is formed of at least one housing shell, of which at least one housing shell includes the at least one filter element.

12. An air inlet system according to claim 11, wherein one housing shell includes the suction opening.

13. An air inlet system according to claim 11 wherein the flow resistance foam is attached to the housing shell which includes the at least one filter element.

14. An air inlet system according to claim 12, wherein the flow resistance foam is attached to the housing shell which includes the suction opening.

15. An air inlet system according to claim 1, wherein the flow resistance foam is a foam made of a polyester material.

16. An air inlet system according to claim 1, wherein the flow resistance foam has a mean density of between 20 and 50 $kg/m^3$.

17. An air inlet system according to claim 1, wherein the filter element is made of a plastic or rubber foam, a nylon mesh or felt.

18. A method for sucking combustion air to a crankcase scavenged two-stroke internal combustion engine, the engine being provided with an air supply passage which connects an interior chamber with at least one transfer duct of the engine for supplying additional air to said at least one transfer duct, the method comprising:

providing a flow resistance foam in the form of a plastic foam or rubber foam in a combustion air flow path, sucking at least a first portion of the combustion air through said foam, wherein the combustion air flow path is extending between an air filter element and a fuel supply unit of the combustion engine, with the flow resistance foam disposed therebetween, the flow resistance foam absorbing fuel or lubricant flowing back from the combustion engine through the combustion air flow path towards the filter element, and thereby preventing said fuel or lubricant from reaching the filter element, wherein the foam has a mean cell diameter of between 2000 and 7000 μm.

19. The method according to claim 18, wherein the first portion is at least 40% of the combustion air and is sucked through the foam.

20. The method according to claim 19, wherein the first portion is at least 70% of the combustion air and is sucked through the foam.

* * * * *